2,772,312
Patented Nov. 27, 1956

2,772,312

PREPARATION OF N:N'-DIBENZYL ETHYLENE DIAMINE

John Southwood, Horsham, England, assignor to The Distillers Company Limited, Edinburgh, Scotland, a British company No Drawing. Application December 20, 1954, Serial No. 476,541

Claims priority, application Great Britain December 31, 1953

5 Claims. (Cl. 260—570.9)

The present invention relates to the production of N:N'-dibenzyl ethylene diamine which is a useful organic intermediate for the production of dibenzyl ethylene diamine di-penicillin which finds application in penicillin therapy. N:N'-dibenzyl ethylene diamine is usually produced by the reduction of N:N'-dibenzylidene ethylene diamine either by catalytic hydrogenation or by means of sodium and ethanol. The catalytic hydrogenation method is often preferred on account of the slightly higher yields obtainable, but the disadvantage of this method is that a by-product, believed to be 1:3-dibenzyl-2-phenyl tetrahydroimidazole, is formed during the hydrogenation. This by-product requires treatment with a strong acid, such as sulphuric acid to achieve its breakdown, and the resulting N:N'-dibenzyl ethylene diamine is precipitated in the form of its sparingly soluble sulphate, which has to be converted to the free diamine or to the diacetate for most of the purposes for which it is used. The reduction of N:N'-dibenzylidene ethylene diamine by means of sodium and ethanol does not give rise to this ring compound.

It is an object of the invention to provide a process for the production of N:N'-dibenzyl ethylene diamine in which the yields obtainable are much improved and the dibenzyl ethylene diamine base is obtainable sufficiently pure to be converted directly to the diacetate without the necessity of resorting to a preliminary isolation by means of the sparingly soluble sulphate.

Accordingly the process for the production of N:N'-dibenzyl ethylene diamine comprises reducing N:N'-dibenzylidene ethylene diamine with a stoichiometrical excess of metallic sodium and a mixture of methanol and isopropanol, the proportions by weight of which lie in the range 1:4 to 1:6, and the weight of which mixture is from 4 to 5½ times the weight of the N:N'-dibenzylidene ethylene diamine, at a temperature approximating the refluxing temperature of the reaction mixture at atmospheric pressure.

The relative proportions of the two alcohols used may vary within the stated range but the preferred proportions are about one part by weight of methanol to about five parts by weight of isopropanol. The amount of the alcohol mixture taken is preferably about five times the weight of the N:N'-dibenzylidene ethylene diamine. A 50% stoichiometrical excess of metallic sodium is desirable.

The reaction is carried out conveniently under refluxing conditions with or without separate agitation. The recovery of the N:N'-dibenzyl ethylene diamine from the reaction mixture may be achieved by addition of water to hydrolyse the sodium alkoxides followed by distillation preferably under somewhat reduced pressure to separate the alcohols. For the purposes of estimating yields, the base may be converted to its sparingly soluble sulphate which may be crystallized from water at low temperatures. The diacetate may also be prepared directly, if desired, and isolated by crystallization.

The following examples illustrate how the invention may be carried out in practice. The yields of N:N'-dibenzyl ethylene diamine were determined by conversion to the sparingly soluble sulphate, except where otherwise stated.

Example 1

118.2 parts by weight of N:N'-dibenzylidene ethylene diamine were dissolved in a mixture of 100 parts by weight of methanol and 400 parts by weight of isopropanol, and the solution heated until refluxing commenced. 69 parts by weight of metallic sodium were added over a period of 3–4 hours, the refluxing being maintained throughout the whole period. During this time the temperature rose gradually from 78° to 104° C. After the last of the sodium had been added and had dissolved 250 parts by weight of water were added to the mixture which separated into two layers. The lower aqueous layer was discarded and the upper layer distilled under a pressure of 560 millimetres of mercury to remove the alcohol. After this distillation a further small quantity of aqueous liquid separated and was removed; the residual base was then dissolved in 600 parts by weight of 10% by weight aqueous sulphuric acid and the solution of N:N'-dibenzyl ethylene diamine sulphate was refluxed for 30 min., after which it was extracted with toluene to remove a small amount of tarry matter. The hot solution was then treated with 5 parts by weight of decolourising carbon, filtered and cooled to 5° C. The sparingly soluble sulphate was filtered off, washed with isopropanol and dried at 50° C. The yield of N:N'-dibenzyl ethylene diamine sulphate was 76.4% based on the weight of N:N'-dibenzylidene ethylene diamine taken.

A duplicate run in which the temperature during the sodium addition rose from 79° to 105° C., gave a yield of 76.0%.

Example 2

When the procedure of Example 1 was repeated using 500 parts by weight of isopropanol instead of 400 parts by weight, the temperature range during the sodium addition being 79°–102° C., a yield of N:N'-dibenzyl ethylene diamine sulphate of 78.1% was obtained.

When the general procedure of the above examples was followed, using 600 parts by weight of ethanol in place of the mixture of the methanol and isopropanol, the highest yield obtainable was 72.8%. A mixture of ethanol and isopropanol gave 72.0%, while methanol or isopropanol alone both gave appreciably lower yields.

Example 3

In order to isolate N:N'-dibenzyl ethylene diamine diacetate directly, the procedure of the previous examples was repeated as far as the vacuum distillation of the alcohols. The residual base was washed once with water and twice with brine (1 part by weight of sodium chloride dissolved in 10 parts by weight of water), then dissolved in 350 parts by weight of isopropanol, and treated with 5.0 parts by weight of decolourising carbon and filtered. The filtrate was then warmed to 70–80° C. and 60.0 parts by weight of acetic acid added and the mixture cooled to 5° C. The crystals of diacetate in three crops were filtered off, washed with isopropanol and dried at 50° C. The yield, using 500 parts by weight of isopropanol and 100 parts by weight of methanol was 80.5% based on the N:N'-dibenzylidene ethylene diamine taken. The temperature during the sodium addition ranged from 79° to 101° C.

Example 4

A total of 118.2 lbs. of N:N'-dibenzylidene ethylene diamine in 2 batches of 23.64 lbs. each and 4 batches of 17.75 lbs. each was dissolved in a mixture of isopropanol (5 parts by weight) and methanol (1 part by weight), the quantity of the mixture for each batch being 100 lbs. or 75 lbs. according to the amount of diamine taken. In each batch, sodium (13.8 lbs. or 10.35 lbs.) was added to the refluxing mixture and refluxing continued with stirring for 1 hour, after which water (50 lbs. or 37.5 lbs.) was added and the mixture allowed to settle before drawing off the aqueous layer. Each batch was then distilled under reduced pressure to remove the alcohols, washed with brine as described in the preceding example, and diluted with isopropanol.

The isopropanol base solutions from these six batches were combined and treated with acetic acid. A total quantity of 140.5 lbs. of crystalline N:N'-dibenzyl ethylene diamine diacetate was produced in three crops. The overall theoretical yield was 78.0% by weight based on the N:N'-dibenzylidene ethylene diamine used.

I claim:

1. A process for the production of N:N'-dibenzyl ethylene diamine which comprises reducing N:N'-dibenzylidene ethylene diamine with an excess of metallic sodium and a mixture of methanol and isopropanol, the proportion methanol:isopropanol being in the range 1:4 to 1:6 by weight and the weight of said mixture being from 4 to 5½ times the weight of the N:N'-dibenzylidene ethylene diamine, at a temperature approximating the refluxing temperature of the reaction mixture at atmospheric pressure.

2. A process according to claim 1 wherein the proportion by weight of methanol to isopropanol in the mixture is about 1:5 by weight.

3. A process according to claim 1 wherein the weight of the mixture is about five times the weight of the N:N'-dibenzylidene ethylene diamine.

4. A process according to claim 1 wherein the reaction is carried out under conditions of reflux.

5. A process for the production of N:N'-dibenzyl ethylene diamine which comprises reducing N:N'-dibenzylidene ethylene diamine with an excess of metallic sodium and a mixture of methanol and isopropanol, the proportion methanol:isopropanol is about 1:5 by weight and the weight of said mixture being about five times the weight of the N:N'-dibenzylidene ethylene diamine, at a temperature corresponding to the refluxing temperature of the reaction mixture at atmospheric pressure.

References Cited in the file of this patent

UNITED STATES PATENTS

| | | |
|---|---|---|
| 2,230,753 | Klavehn et al. | Feb. 4, 1941 |
| 2,627,491 | Szabo et al. | Feb. 3, 1953 |

FOREIGN PATENTS

| | | |
|---|---|---|
| 598,312 | Great Britain | Feb. 16, 1948 |